UNITED STATES PATENT OFFICE.

DANIEL HAND, OF NEWARK, NEW JERSEY, ASSIGNOR TO GENERAL ELECTRIC COMPANY, A CORPORATION OF NEW YORK.

COMPOSITION OF MATTER FOR BASING-CEMENT.

No. 917,057.　　　Specification of Letters Patent.　　　Patented April 6, 1909.

Application filed September 22, 1906. Serial No. 335,695.

*To all whom it may concern:*

Be it known that I, DANIEL HAND, citizen of the United States, residing at Newark, county of Essex, State of New Jersey, have invented certain new and useful Improvements in Compositions of Matter for Basing-Cement, of which the following is a specification.

My invention relates to the manufacture of cement and particularly the kind used in the manufacture of incandescent lamps for attaching the bases of the lamps to the bulbs. The cement used for this purpose is usually called a "basing compound".

The object of my invention is the production of a cement of high melting point having a high degree of adhesiveness which will flow readily when heated and which soon sets and holds together in a permanent manner the parts to which it is applied.

A further object of my invention is the production of a cement for use as a basing compound which is composed of materials cheap in themselves and which can be easily mixed together to form the compound.

To give my cement the necessary adhesive quality, I use gums or resins of various kinds, for instance, rosin, manila, mastic, dammar, and copal gums generally. The melting point of these various gums is low, but I find that by mixing with them certain proportions of metallic oxids a resinate compound is formed, the melting point of which is higher than that of the gum alone. I have found that it is best to use oxids for this purpose which have a basic nature and not an acidic character, for instance such metallic oxids as calcium oxid, magnesium oxid, aluminum oxid, zinc oxid, lead oxid, etc. The melting point which any of these compounds of gum and metallic oxid will have, depends upon the particular substances used and upon the proportions in which they are combined.

In order to cheapen the compound without interfering with its adhesiveness and flowing property, I add to the compound of gum and metallic oxid as a diluent, some inert material. For this purpose I find such substances as barytes, plaster of paris, whiting, lead sulfate, etc., are well adapted.

The process of combining the above ingredients to form a satisfactory basing compound is very simple and may be as follows: The gum or mixture of gums is first melted to a smoothly fluid state. The proper amount of metallic oxid is then slowly added and stirred into the gum until the whole has become a uniformly fluid mass, the heat being continued meanwhile. To this metallic oxid and gum compound, while in this fluid condition, is slowly added, during constant stirring, varying proportions of inert material, the quantity of this depending upon the character of the inert substance used and the purpose for which the cement is intended. The addition of inert material is, of course, not carried so far as to interfere with the flowing of the completely mixed mass when this is to be used in basing.

In order to indicate the manner in which various gums and metallic oxids may be combined and mixed with an inert material to form a cement having characteristics which adapt it for any particular purpose, I will now describe a compound which I have found to be admirably suited for certain purposes, especially the basing of incandescent lamps. To give my compound the quality of adhesiveness I use what is generally called rosin, but to this I add a small amount of a certain grade of Manila gum known as "lacquer stock". The purpose of the Manila gum is to raise the melting point of the compound, and this end is also attained by the addition of a metallic oxid as, for example, zinc oxid in the manner explained above. For my inert material I prefer either barytes or plaster of paris. The relative amounts of these ingredients which I use are given below, the percentages being based on the total weight of materials used: rosin 18%, Manila lacquer stock 2%, zinc oxid 5%, barytes 75%. This compound has a melting point of about 125° C. and will readily flow in a stream from the heating pot into the lamp base. When plaster of paris is used instead of barytes, the proportions of the ingredients which go to make up the compound should be as follows: rosin 36%, Manila lacquer stock 4%, zinc oxid 10%, plaster of paris 50%.

Although I have described in particular two compounds in which are embodied the principles of my invention, I wish it distinctly understood that I do not mean to be limited to these and that I consider all compounds in which substances of the classes enumerated above are combined in a manner similar to that which I have described are within the scope of my invention. Compounds of many kinds having properties which fit them for use in various arts may be formed in the manner I have indicated. The melting point of these various compounds depends upon the fact that when any gum is heated with a metallic oxid there results a compound which has a very much higher melting point than the gum originally had. What the melting point of the compound will be, depends of course, upon the particular gum used and the amount and kind of metallic oxid which is employed.

What I claim as new and desire to secure by Letters Patent of the United States, is,—

1. The herein-described composition of matter consisting of rosin; a metallic oxid mixed therewith to form a chemical compound, a gum having a higher melting point than said compound, and an inert diluent.

2. The herein-described composition of matter consisting of rosin, zinc oxid mixed therewith to form zinc resinate, a gum having a higher melting point than said resinate, and a powdered inert diluent.

3. A composition of matter consisting of rosin, a basic oxid, Manila gum, and an inert material.

4. A composition of matter consisting of the following substances substantially in the proportion by weight indicated: rosin 18%, Manila gum 2%, zinc oxid 5%, and barytes 75%.

In witness whereof, I have hereunto set my hand this 20th day of September, 1906.

DANIEL HAND.

Witnesses:
S. N. WHITEHEAD,
J. HARRY ELKINS.